(12) United States Patent
Temple (10) Patent No.: US 10,023,095 B2
(45) Date of Patent: Jul. 17, 2018

(54) VEHICLE MOVING DEVICE

(71) Applicant: Darrell Temple, Azle, TX (US)

(72) Inventor: Darrell Temple, Azle, TX (US)

(*) Notice: Subject to any disclaimer, the term of this patent is extended or adjusted under 35 U.S.C. 154(b) by 97 days.

(21) Appl. No.: 15/210,228

(22) Filed: Jul. 14, 2016

(65) Prior Publication Data

US 2018/0015867 A1     Jan. 18, 2018

(51) Int. Cl.
*B60P 3/12* (2006.01)
*F16H 25/24* (2006.01)
*F16H 25/20* (2006.01)

(52) U.S. Cl.
CPC .............. *B60P 3/125* (2013.01); *F16H 25/24* (2013.01); *F16H 2025/209* (2013.01); *F16H 2025/2084* (2013.01)

(58) Field of Classification Search
CPC ......... B60P 3/125; B62D 65/18; F16H 25/24; F16H 2025/2084; F16H 2025/209
USPC ........ 414/563, 469, 351, 392, 471; 180/904, 180/9.32, 9.4
See application file for complete search history.

(56) References Cited

U.S. PATENT DOCUMENTS

| | | | | | |
|---|---|---|---|---|---|
| 3,285,626 | A | * | 11/1966 | Blonsky | B60P 3/40 180/9.4 |
| 3,360,281 | A | * | 12/1967 | Allen | B62D 53/061 180/9.4 |
| 3,827,586 | A | * | 8/1974 | Lambert, Sr. | B60P 3/127 254/264 |
| 4,778,333 | A | * | 10/1988 | Youmans | B60P 3/125 280/402 |
| 5,451,135 | A | | 9/1995 | Schempf et al. | |
| 5,529,454 | A | * | 6/1996 | Alm | B60P 3/07 414/478 |
| 5,984,616 | A | * | 11/1999 | Youmans | B60P 3/125 280/402 |
| 6,290,449 | B1 | * | 9/2001 | Lewis | B60P 3/122 414/494 |
| 7,318,698 | B1 | * | 1/2008 | Gipson | B60P 3/125 280/402 |
| 8,413,752 | B2 | | 4/2013 | Page et al. | |
| 8,528,673 | B2 | * | 9/2013 | More | B25J 5/005 180/9.32 |
| 8,763,732 | B2 | | 7/2014 | Won | |
| 8,851,824 | B2 | * | 10/2014 | Pallanich | B60P 3/125 414/469 |

(Continued)

FOREIGN PATENT DOCUMENTS

WO    WO2010010811    1/2010

*Primary Examiner* — Kaitlin S Joerger (57) ABSTRACT

A vehicle moving device for moving vehicles includes a frame that is angled. A front of the frame is taller than a back of the frame. A ramp is coupled to a top of the frame and extends from proximate to the front to proximate to the back. A first motor and a second motor are coupled to the frame. An actuator, which is operationally coupled to the first motor, is slidably coupled to the ramp. A coupler is coupled to the actuator and is configured to couple to a vehicle. A plurality of rollers is rotationally coupled to the frame and is operationally coupled to the second motor. The first motor is positioned to compel the actuator longitudinally along the ramp such that the vehicle coupled to the coupler is lifted from the ground. The second motor is positioned to compel the rollers to rotate to move the vehicle.

17 Claims, 6 Drawing Sheets

(56) References Cited

U.S. PATENT DOCUMENTS

2011/0170994 A1  7/2011  Coombs et al.

* cited by examiner

VEHICLE MOVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to moving devices and more particularly pertains to a new moving device for moving vehicles.

BRIEF SUMMARY OF THE INVENTION

An embodiment of the disclosure meets the needs presented above by generally comprising a frame that is angled. A front of the frame is taller than a back of the frame. A ramp is coupled to a top of the frame and extends from proximate to the front to proximate to the back. A first motor and a second motor are coupled to the frame. An actuator, which is operationally coupled to the first motor, is slidably coupled to the ramp. A coupler is coupled to the actuator and is configured to couple to a vehicle. A plurality of rollers is rotationally coupled to the frame and is operationally coupled to the second motor. The first motor is positioned to compel the actuator longitudinally along the ramp such that the vehicle coupled to the coupler is lifted from the ground. The second motor is positioned to compel the rollers to rotate to move the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new moving device embodying the principles and concepts of an embodiment of the disclosure and generally designated by the reference numeral 10 will be described.

As best illustrated in FIGS. 1 through 6, the vehicle moving device 10 generally comprises a frame 12. The frame 12 is angled, such that a front 14 of the frame 12 is taller than a back 16 of the frame 12. The frame 12 comprises a pair of opposing horizontal supports 18, a plurality of crossbars 20 and a plurality of vertical supports 22. The crossbars 20 are coupled to and extend between the opposing horizontal supports 18. The vertical supports 22 are coupled singly to and extend perpendicularly from the crossbars 20.

A ramp 24 is coupled to a top 26 of the frame 12 and extends from proximate to the front 14 to proximate to the back 16. In one embodiment, the ramp 24 is coupled to each vertical support 22 distal from the crossbars 20. The ramp 24 is positioned equally distant from the opposing horizontal supports 18.

A first motor 28 is coupled to the frame 12. The first motor 28 is coupled to a drive gear 30. An actuator 32 is slidably coupled to the ramp 24. The actuator 32 is operationally coupled to the first motor 28. In one embodiment, the actuator 32 comprises a worm gear 34 and a bracket 36. The worm gear 34 is coupled to an underside 38 of the ramp 24. The worm gear 34 is complementary to the drive gear 30 and is gearedly coupled to the drive gear 30. The bracket 36 is rollably coupled to the ramp 24. The bracket 36 is gearedly coupled to the worm gear 34. The first motor 28 is positioned to rotate the drive gear 30 such that the worm gear 34 rotates and the bracket 36 is compelled longitudinally along the ramp 24.

A coupler 40 is coupled to the actuator 32. The coupler 40 is configured to couple to a vehicle. In one embodiment, the coupler 40 comprises a neck 42 that is coupled to the bracket 36. The neck 42 is coupled to the bracket 36 such that the neck 42 is configured to position between the frame 12 and the vehicle. In one embodiment, the coupler 40 comprises a wrecker claw 44 that is coupled to the neck 42 distal from the bracket 36. The wrecker claw 44 is configured to couple to an axle of a vehicle. The wrecker claw 44 also is configured to couple to wheels of a vehicle. In another embodiment, the coupler 40 comprises a hitch ball 46 that is coupled to the neck 42 distal from the bracket 36. The hitch ball 46 is configured to couple to a hitch that is coupled to the vehicle.

A second motor 48 is coupled to the frame 12. In one embodiment, the second motor 48 is coupled to the underside 38 of the ramp 24 proximate to the front 14. In another embodiment, the second motor 48 comprises an engine 50.

A plurality of rollers 52 is rotationally coupled to the frame 12. The rollers 52 are operationally coupled to the second motor 48. In one embodiment, the plurality of rollers 52 comprises two sets of wheels 54. Each set of wheels 54 comprises a drive wheel 56, a plurality of cog wheels 58 and a caterpillar track 60. The drive wheel 56 is operationally coupled to the second motor 48. The plurality of cog wheels 58 is coupled to a respective opposing horizontal support 18 of the frame 12.

In another embodiment, the plurality of cog wheels 58 comprises cog wheels 58 positioned four each on an inside face 62 and an outside face 64 of the respective opposing horizontal support 18. Two cog wheels 58 are positioned proximate to the front 14 and two cog wheels 58 are positioned proximate to the back 16. Four cog wheels 58 are substantially evenly spaced between the front 14 and the back 16.

The caterpillar track 60 is positioned around and is operationally coupled to both the drive wheel 56 and the plurality of cog wheels 58. The second motor 48 is positioned to motivate the drive wheel 56 to rotate. The rotational force from the drive wheel 56 is transferred to the caterpillar track 60 and the plurality of cog wheels 58, such that the frame 12 is movable.

A controller 66 is coupled to the frame 12 and is operationally coupled to the first motor 28 and the second motor 48. The controller 66 is positioned to compel the second motor 48 to selectively rotate the drive wheels 56. The controller 66 also is positioned to compel the first motor 28 to motivate the bracket 36 longitudinally along the ramp 24. The controller 66 comprises a remote control 68. The remote control 68 is configured to compel the controller 66 to selectively motivate the first motor 28 and the second motor 48.

A power module 70 is coupled to the frame 12 proximate to the front 14. In one embodiment, the power module 70 is operationally coupled to the first motor 28. In another embodiment, the power module 70 is operationally coupled to the second motor 48. In yet another embodiment, the power module 70 comprises at least one battery 72.

Figure 1:
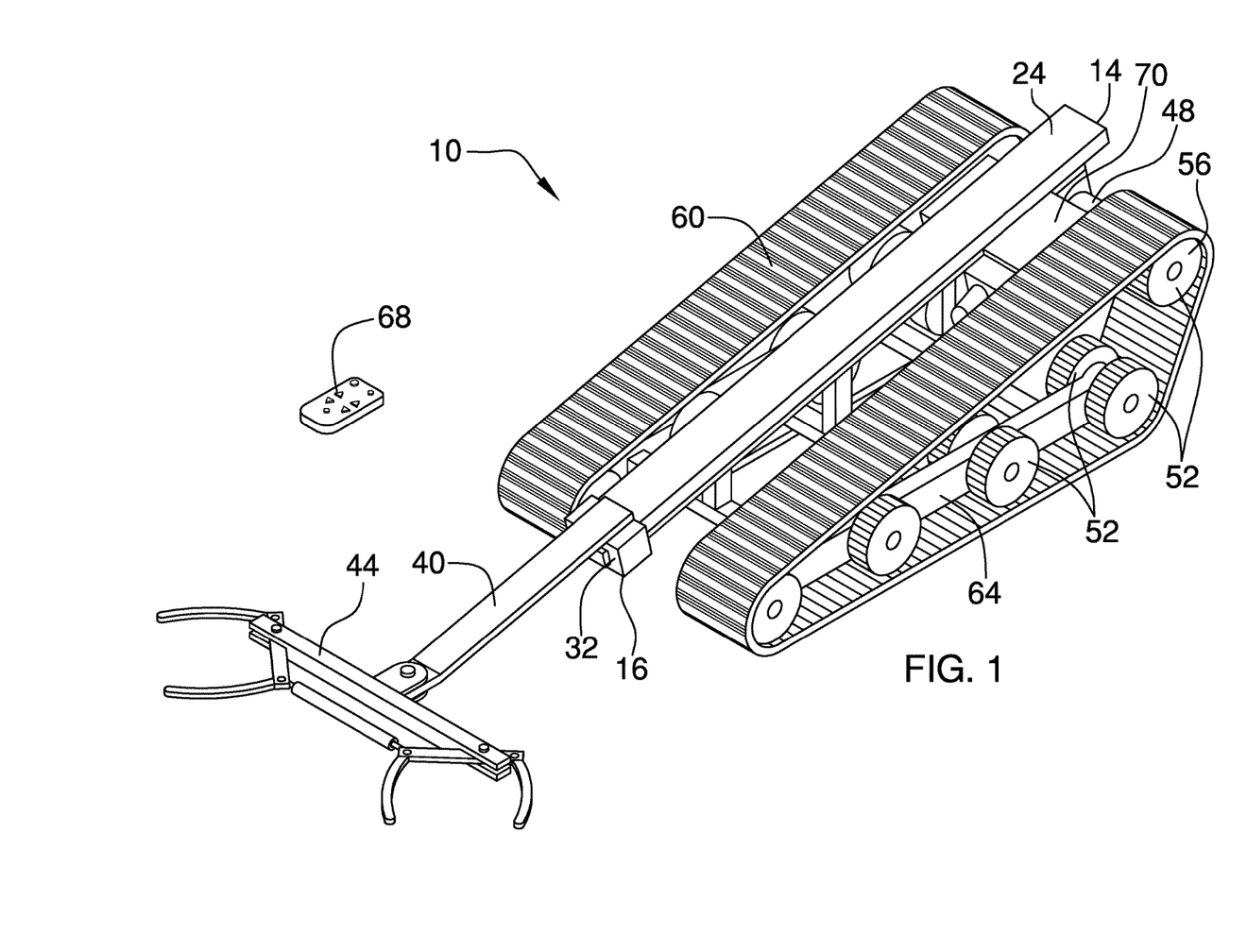
FIG. 1 is an isometric perspective view of a vehicle moving device according to an embodiment of the disclosure.
Figure 2:
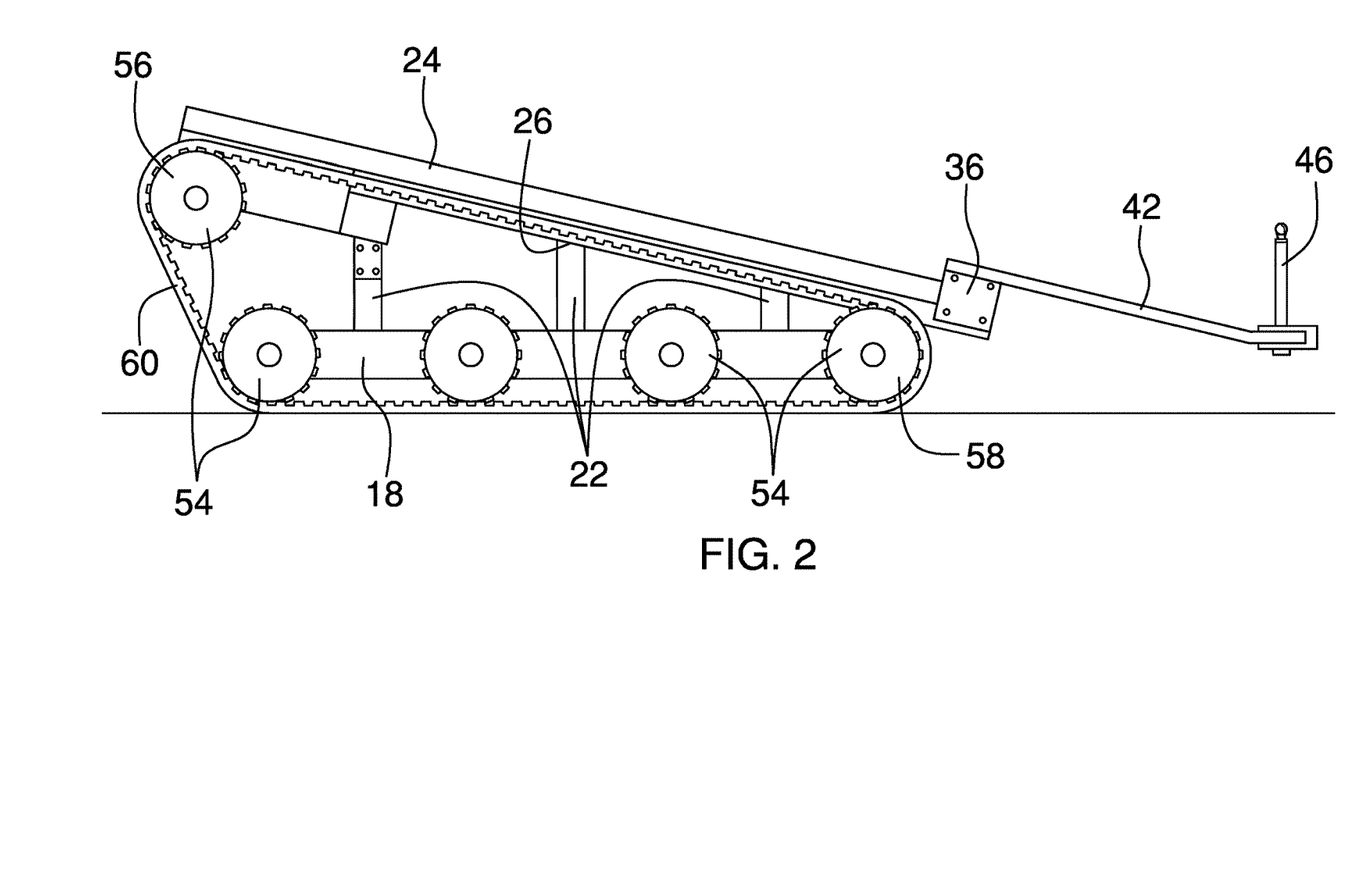
FIG. 2 is a side view of an embodiment of the disclosure.
Figure 3:
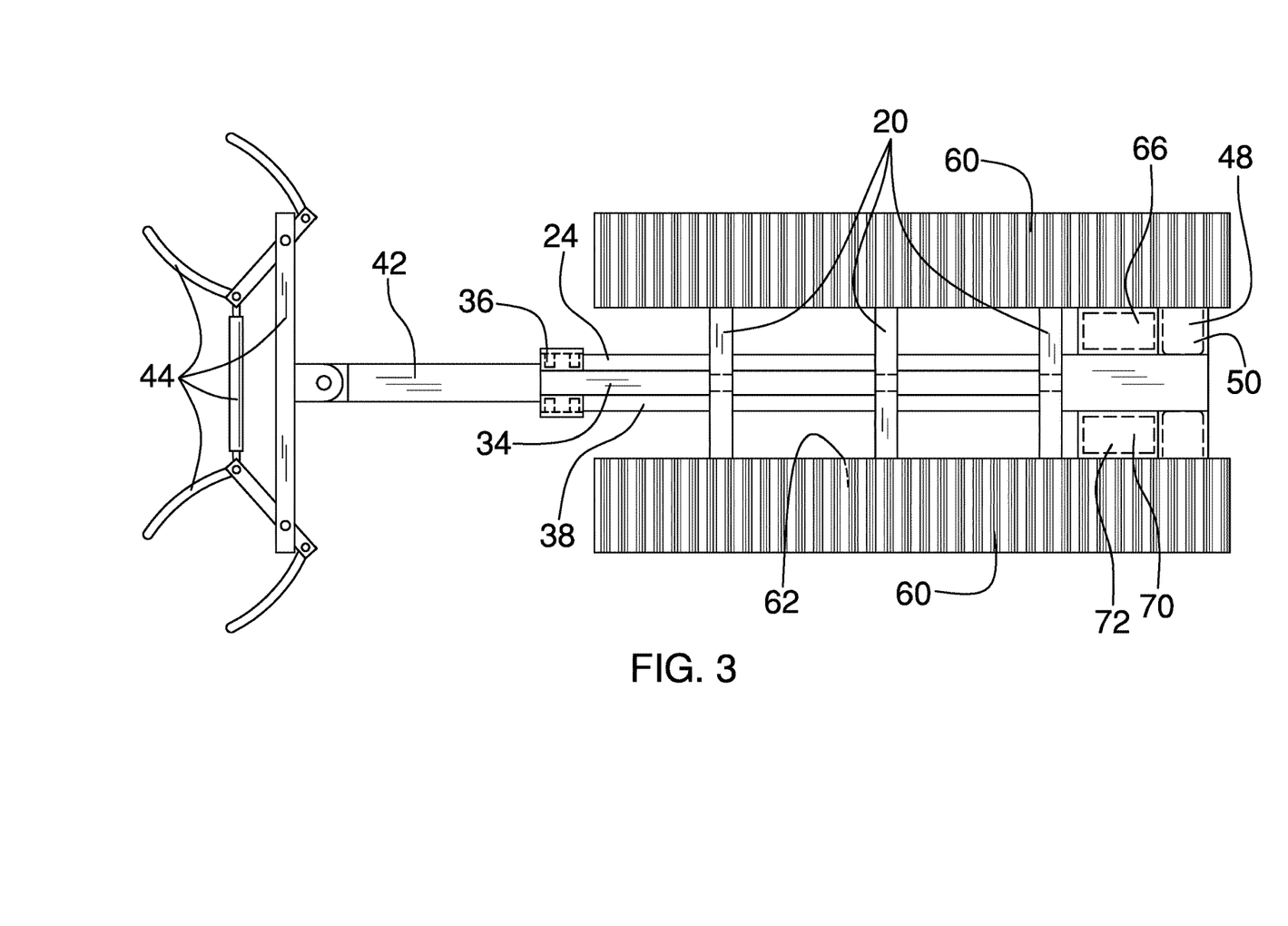
FIG. 3 is a bottom view of an embodiment of the disclosure.
Figure 4:
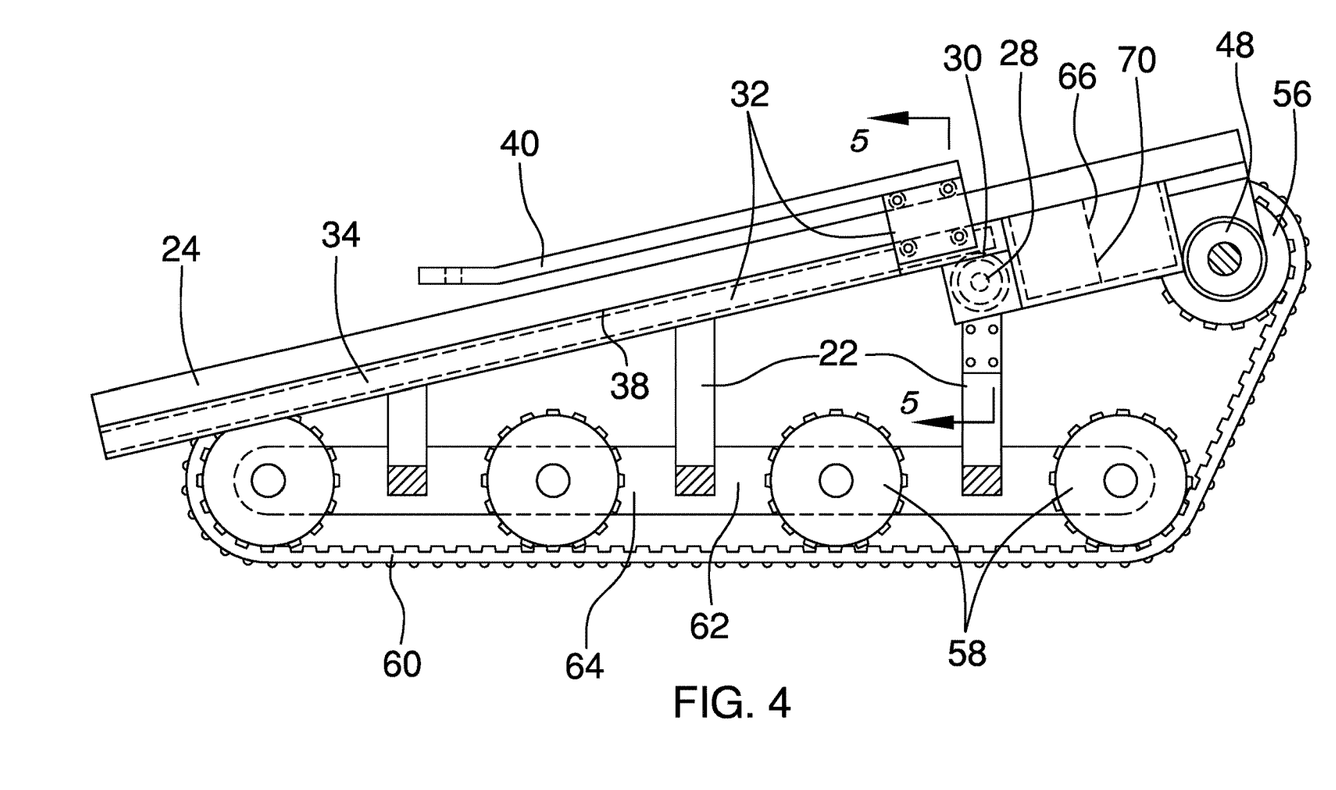
FIG. 4 is a cross-sectional view of an embodiment of the disclosure.
Figure 5:
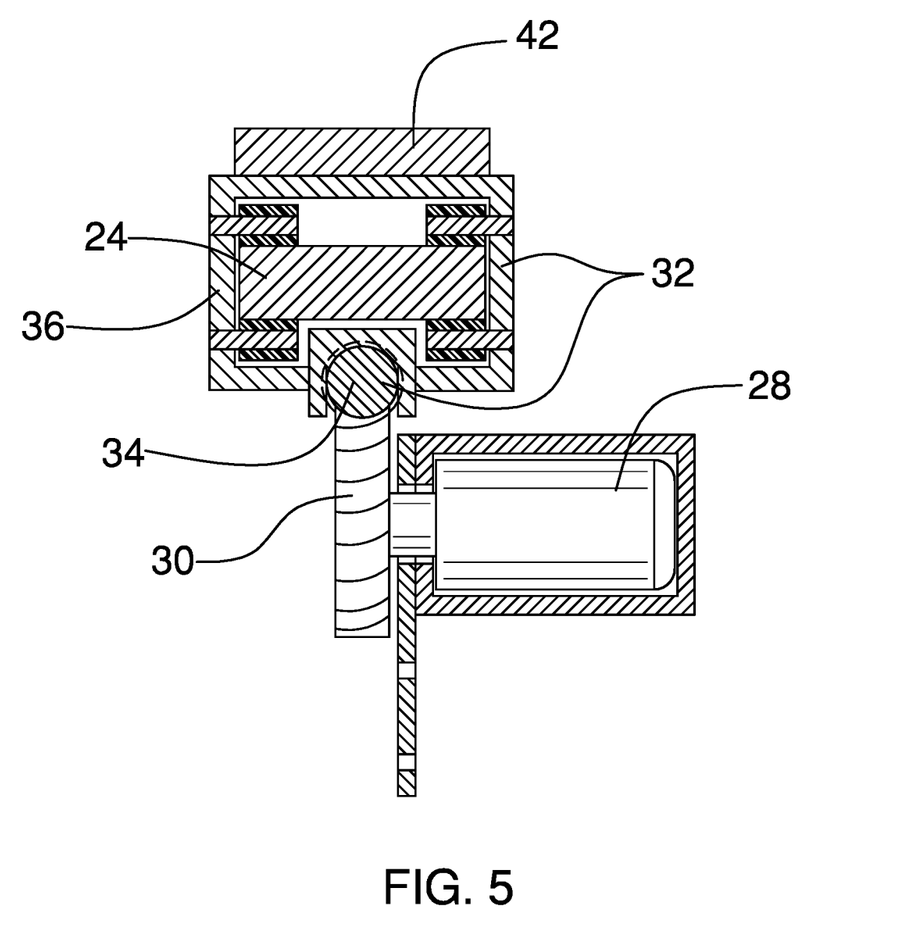
FIG. 5 is a cross-sectional view of an embodiment of the disclosure.
Figure 6:
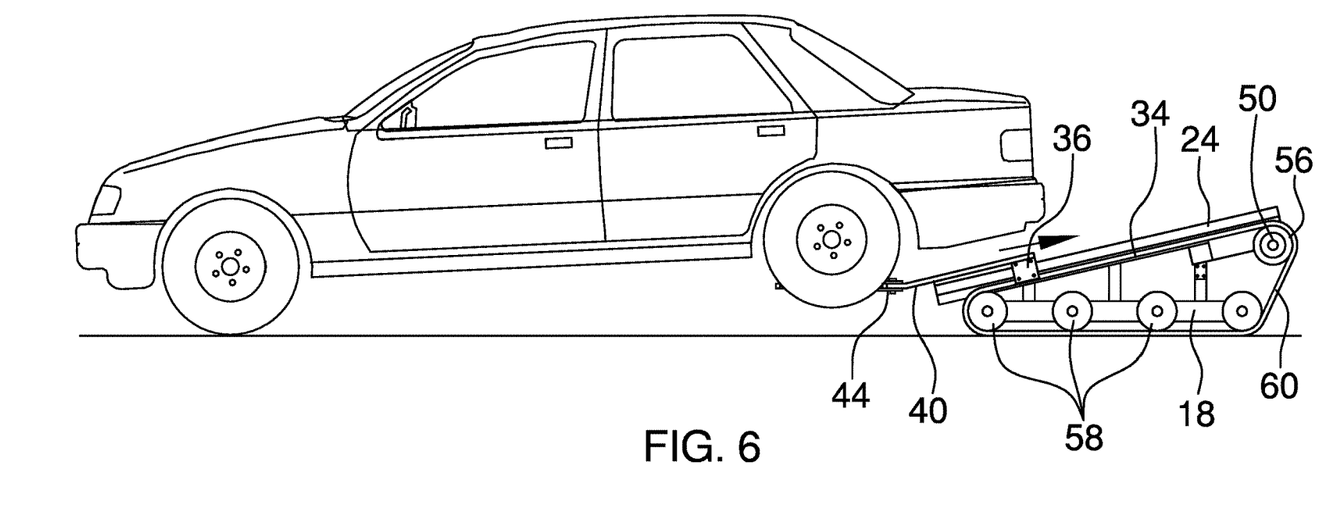
FIG. 6 is a side view of an embodiment of the disclosure in use.

In use, the coupler 40 is configured to couple to the vehicle. The first motor 28 is positioned to rotate the drive gear 30 such that the worm gear 34 rotates. The bracket 36 is compelled longitudinally along the ramp 24 and the vehicle is lifted from the ground. The second motor 48 is positioned to motivate the drive wheel 56 to rotate, such that rotational force is transferred to the caterpillar track 60 and the plurality of cog wheels 58 to move the frame 12 and the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle moving device comprising:
   a frame, said frame being angled, such that a front of said frame is taller than a back of said frame;
   a ramp coupled to a top of said frame and extending from proximate to said front to proximate to said back;
   a first motor coupled to said frame;
   an actuator slidably coupled to said ramp, said actuator being operationally coupled to said first motor;
   a coupler coupled to said actuator, said coupler being configured for coupling to a vehicle;
   a second motor coupled to said frame, said second motor being coupled to said underside of said ramp proximate to said front;
   a plurality of rollers rotationally coupled to said frame, said rollers being operationally coupled to said second motor; and
   wherein said coupler is couplable to the vehicle such that said first motor is positioned to compel said actuator longitudinally along said ramp such that the vehicle is lifted from the ground, wherein said second motor is positioned to compel said rollers to rotate such that the vehicle is moved.

2. A vehicle moving device comprising:
   a frame, said frame being angled, such that a front of said frame is taller than a back of said frame;
   a ramp coupled to a top of said frame and extending from proximate to said front to proximate to said back;
   a first motor coupled to said frame;
   an actuator slidably coupled to said ramp, said actuator being operationally coupled to said first motor;
   a coupler coupled to said actuator, said coupler being configured for coupling to a vehicle;
   a second motor coupled to said frame;
   a plurality of rollers rotationally coupled to said frame, said rollers being operationally coupled to said second motor;
   wherein said coupler is couplable to the vehicle such that said first motor is positioned to compel said actuator longitudinally along said ramp such that the vehicle is lifted from the ground, wherein said second motor is positioned to compel said rollers to rotate such that the vehicle is moved; and
   said frame comprising
      a pair of opposing horizontal supports,
      a plurality of crossbars coupled to and extending between said opposing horizontal supports, and a plurality of vertical supports coupled singly to and extending perpendicularly from said crossbars.

3. The device of claim 2, further including said ramp being coupled to each said vertical support distal from said crossbars such that said ramp is positioned equally distant from said opposing horizontal supports.

4. The device of claim 3, further comprising:
said first motor being coupled to a drive gear;
said actuator comprising:
a worm gear coupled to an underside of said ramp, said worm gear being complementary to said drive gear, said worm gear being gearedly coupled to said drive gear, and
a bracket rollably coupled to said ramp, said bracket being gearedly coupled to said worm gear; and
wherein said first motor is positioned to rotate said drive gear such that said worm gear rotates, wherein said bracket is compelled longitudinally along said ramp.

5. The device of claim 4, further including said coupler comprising a neck coupled to said bracket, wherein said neck is coupled to said bracket such that said neck is configured for positioning between said frame and the vehicle.

6. The device of claim 5, further including said coupler comprising a wrecker claw coupled to said neck distal from said bracket, said wrecker claw being configured to couple to an axle of a vehicle.

7. The device of claim 6, further including said wrecker claw being configured to couple to wheels of a vehicle.

8. The device of claim 5, further including said coupler comprising a hitch ball coupled to said neck distal from said bracket, said hitch ball being configured to couple to a hitch coupled to the vehicle.

9. The device of claim 1, further including said second motor comprising an engine.

10. The device of claim 4, further including said plurality of rollers comprising two sets of wheels, each said set of wheels comprising:
a drive wheel operationally coupled to said second motor;
a plurality of cog wheels coupled to a respective opposing horizontal support of said frame;
a caterpillar track positioned around and operationally coupled to said drive wheel and said plurality of cog wheels; and
wherein said second motor is positioned to motivate said drive wheel to rotate, such that rotational force is transferred to said caterpillar track and said plurality of cog wheels, wherein said frame is movable.

11. The device of claim 10, further including said plurality of cog wheels comprising cog wheels positioned four each on an inside face and an outside face of said respective said opposing horizontal support, such that two said cog wheels are positioned proximate to said front, two said cog wheels are positioned proximate to said back, and four said cog wheels are substantially evenly spaced between said front and said back.

12. The device of claim 10, further including a controller coupled to said frame and operationally coupled to said first motor and said second motor, said controller being positioned to compel said second motor to selectively rotate said drive wheels, said controller being positioned to compel said first motor to motivate said bracket longitudinally along said ramp.

13. The device of claim 12, further including said controller comprising a remote control, said remote control being configured to compel said controller to selectively motivate said first motor and said second motor.

14. The device of claim 1, further including a power module coupled to said frame proximate to said front, said power module being operationally coupled to said first motor.

15. The device of claim 14, further including said power module being operationally coupled to said second motor.

16. The device of claim 14, further including said power module comprising at least one battery.

17. A vehicle moving device comprising:
a frame, said frame being angled, such that a front of said frame is taller than a back of said frame, said frame comprising:
a pair of opposing horizontal supports,
a plurality of crossbars coupled to and extending between said opposing horizontal supports, and
a plurality of vertical supports coupled singly to and extending perpendicularly from said crossbars;
a ramp coupled to a top of said frame and extending from proximate to said front to proximate to said back, said ramp being coupled to each said vertical support distal from said crossbars such that said ramp is positioned equally distant from said opposing horizontal supports;
a first motor coupled to said frame, said first motor being coupled to a drive gear;
an actuator slidably coupled to said ramp, said actuator being operationally coupled to said first motor, said actuator comprising:
a worm gear coupled to an underside of said ramp, said worm gear being complementary to said drive gear, said worm gear being gearedly coupled to said drive gear,
a bracket rollably coupled to said ramp, said bracket being gearedly coupled to said worm gear, and
wherein said first motor is positioned to rotate said drive gear such that said worm gear rotates, wherein said bracket is compelled longitudinally along said ramp;
a coupler coupled to said actuator, said coupler being configured for coupling to a vehicle, said coupler comprising a neck coupled to said bracket, wherein said neck is coupled to said bracket such that said neck is configured for positioning between said frame and the vehicle, said coupler comprising a wrecker claw coupled to said neck distal from said bracket, said wrecker claw being configured to couple to an axle of a vehicle, said wrecker claw being configured to couple to wheels of a vehicle, said coupler comprising a hitch ball coupled to said neck distal from said bracket, said hitch ball being configured to couple to a hitch coupled to the vehicle;
a second motor coupled to said frame, said second motor being coupled to said underside of said ramp proximate to said front, said second motor comprising an engine;
a plurality of rollers rotationally coupled to said frame, said rollers being operationally coupled to said second motor, said plurality of rollers comprising two sets of wheels, each said set of wheels comprising:
a drive wheel operationally coupled to said second motor,
a plurality of cog wheels coupled to a respective opposing horizontal support of said frame, said plurality of cog wheels comprising cog wheels positioned four each on an inside face and an outside face of said respective said opposing horizontal support, such that two said cog wheels are positioned proximate to said front, two said cog wheels are positioned proximate to said back, and four said cog wheels are substantially evenly spaced between said front and said back, a caterpillar track positioned around and operationally coupled to said drive wheel and said plurality of cog wheels, and wherein said second motor is positioned to motivate said drive wheel to rotate, such that rotational force is transferred to said caterpillar track and said plurality of cog wheels, wherein said frame is movable;

a controller coupled to said frame and operationally coupled to said first motor and said second motor, said controller being positioned to compel said second motor to selectively rotate said drive wheels, said controller being positioned to compel said first motor to motivate said bracket longitudinally along said ramp, said controller comprising a remote control, said remote control being configured to compel said controller to selectively motivate said first motor and said second motor;

a power module coupled to said frame proximate to said front, said power module being operationally coupled to said first motor, said power module being operationally coupled to said second motor, said power module comprising at least one battery; and wherein said coupler is couplable to the vehicle, wherein said first motor is positioned to rotate said drive gear such that said worm gear rotates, wherein said bracket is compelled longitudinally along said ramp, such that the vehicle is lifted from the ground, wherein said second motor is positioned to motivate said drive wheel to rotate, such that rotational force is transferred to said caterpillar track and said plurality of cog wheels, wherein said frame is movable.

* * * * *